(12) United States Patent
Bill-Clark

(10) Patent No.: US 11,623,654 B2
(45) Date of Patent: Apr. 11, 2023

(54) SYSTEMS AND METHODS OF ASSISTING VEHICLE NAVIGATION

(71) Applicant: Nissan North America, Inc., Franklin, TN (US)

(72) Inventor: Luis Bill-Clark, San Francisco, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/308,818

(22) Filed: May 5, 2021

(65) Prior Publication Data
US 2022/0355815 A1   Nov. 10, 2022

(51) Int. Cl.
| | |
|---|---|
| *B60Q 1/00* | (2006.01) |
| *B60W 50/14* | (2020.01) |
| *B60W 40/08* | (2012.01) |
| *G06V 20/58* | (2022.01) |
| *G06V 40/10* | (2022.01) |

(52) U.S. Cl.
CPC ............ *B60W 50/14* (2013.01); *B60W 40/08* (2013.01); *G06V 20/582* (2022.01); *G06V 40/103* (2022.01); *B60W 2050/143* (2013.01); *B60W 2050/146* (2013.01); *B60W 2420/42* (2013.01); *B60W 2540/225* (2020.02); *B60W 2554/4029* (2020.02); *B60W 2554/4041* (2020.02)

(58) Field of Classification Search
CPC ............. B60W 50/14; B60W 40/08; B60W 2050/143; B60W 2050/146; B60W 2420/42; B60W 2540/225; B60W 2554/4029; B60W 2554/4041; G06V 20/582; G06V 40/103

USPC ............... 340/435, 436, 439, 575, 576
See application file for complete search history.

(56) References Cited

U.S. PATENT DOCUMENTS

| | | | |
|---|---|---|---|
| 9,245,171 B2* | 1/2016 | Aoki | G06V 40/161 |
| 10,867,512 B2 | 12/2020 | Ran et al. | |
| 11,180,159 B1* | 11/2021 | Post | B60W 50/14 |
| 11,269,420 B1* | 3/2022 | Marti | G06F 3/013 |
| 2005/0182564 A1 | 8/2005 | Kim | |
| 2018/0072218 A1* | 3/2018 | Sweeney | B60Q 1/2696 |

(Continued)

FOREIGN PATENT DOCUMENTS

WO    2020/142112 A1    7/2020

OTHER PUBLICATIONS

Fridman et al., Large-Scale Naturalistic Driving Study of Driver Behavior and Interaction with Automation, arXiv:1711.06976v4 [cs.CY], Aug. 14, 2019, pp. 1-16.

(Continued)

*Primary Examiner* — Anh V La
(74) *Attorney, Agent, or Firm* — Global IP Counselors, LLP

(57) ABSTRACT

Systems and methods for assisting navigation of a vehicle are disclosed. In one embodiment, a method of assisting navigation of a vehicle includes receiving navigational data relating to an intended route of the vehicle, receiving object data relating to at least one external object detected within a vicinity of a current position of the vehicle, determining whether the at least one external object affects an ability of the vehicle to proceed along the intended route, and generating at least one instruction relating to the ability of the vehicle to proceed along the intended route.

20 Claims, 8 Drawing Sheets

(56) References Cited

U.S. PATENT DOCUMENTS

| | | | |
|---|---|---|---|
| 2019/0113916 A1* | 4/2019 | Guo | G05D 1/0088 |
| 2020/0250473 A1 | 8/2020 | Elluswamy et al. | |
| 2021/0304608 A1* | 9/2021 | Clark | B60W 50/14 |
| 2021/0323541 A1* | 10/2021 | Zhu | B60W 30/09 |

OTHER PUBLICATIONS

Amini et al.. Variational End-to-End Navigation and Localization, netarXiv:1811.10119v2[cs.LG], Jun. 11, 2019, pp. 1-7.

Dao et al., OpenPose: Realtime Multi-Person 2D Pose Estimation using Part Affinity Fields, higharXiv: 1812.08008v2 [cs.CV], May 30, 2019, pp. 1-14.

Artunedo et al., A decision-making architecture for automated driving without detailed prior maps, pp. 1-8.

Chen et al., Autonomous driving: cognitive construction and situation understanding, Science China, Aug. 2019, vol. 62 081101:1-081101:27, https://doi.org/10.1007/s11432-018-9850-9.

Tang, A Novel Road Marking Detection and Recognition Technique using a Camera-based Advanced Driver Assistance System, 2017, pp. ii-xiv, 1-171, University of Ottawa, Ottawa, Canada.

\* cited by examiner

SYSTEMS AND METHODS OF ASSISTING VEHICLE NAVIGATION

BACKGROUND

Technical Field

The present disclosure generally relates to systems and methods of assisting with navigation of a vehicle. More specifically, the present disclosure relates to systems and methods which detect or analyze external objects and assist a driver with navigation of the vehicle based thereon.

Background Information

Various vehicle navigation assistance technologies exist. Some existing technologies allow an autonomous vehicle to take full control of lane changes and stop at stop lights as long as a driver is supervising the vehicle, but these technologies can result in mistakes which force the driver to take control. Other simpler technologies assist the driver with tasks such as detecting objects in the vehicle's path and staying within the vehicle's lane.

SUMMARY

It has been discovered that an intelligent co-pilot or co-driver system which is configured to assist the driver of a vehicle is desired. The present disclosure provides intelligent driving assist technology systems and methods that aid the driver of a vehicle with navigation in real-time, for example, using various sensors in combination with a navigation system such as a global positioning system ("GPS"). The systems and methods of the present disclosure can further be used to train an autonomous vehicle to behave more like a human-driven vehicle and operate the autonomous vehicle based thereon.

In view of the state of the known technology, one aspect of the present disclosure is to provide a method of assisting navigation of a vehicle. The method includes receiving navigational data relating to an intended route of the vehicle, receiving object data relating to at least one external object detected within a vicinity of a current position of the vehicle, determining whether the at least one external object affects an ability of the vehicle to proceed along the intended route, and generating at least one instruction relating to the ability of the vehicle to proceed along the intended route.

A second aspect of the present disclosure is to provide another method of assisting navigation of a vehicle. The method includes receiving pedestrian data regarding a pedestrian detected within a vicinity of a current position of the vehicle, determining an intended path of the pedestrian, determining whether the intended path of the pedestrian interferes with an intended route of the vehicle, and generating at least one instruction when the intended path of the pedestrian is determined to interfere with the intended route of the vehicle.

A third aspect of the present disclosure is to provide yet another method of assisting navigation of a vehicle. The method includes receiving driver data relating to a current line of sight detected for a driver of the vehicle, receiving object data relating to at least one external object detected within a vicinity of a current position of the vehicle, determining that the at least one external object is outside of the current line of sight of the driver, and generating at least one instruction relating to the at least one external object.

A fourth aspect of the present disclosure is to provide systems configured to perform the methods described herein.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
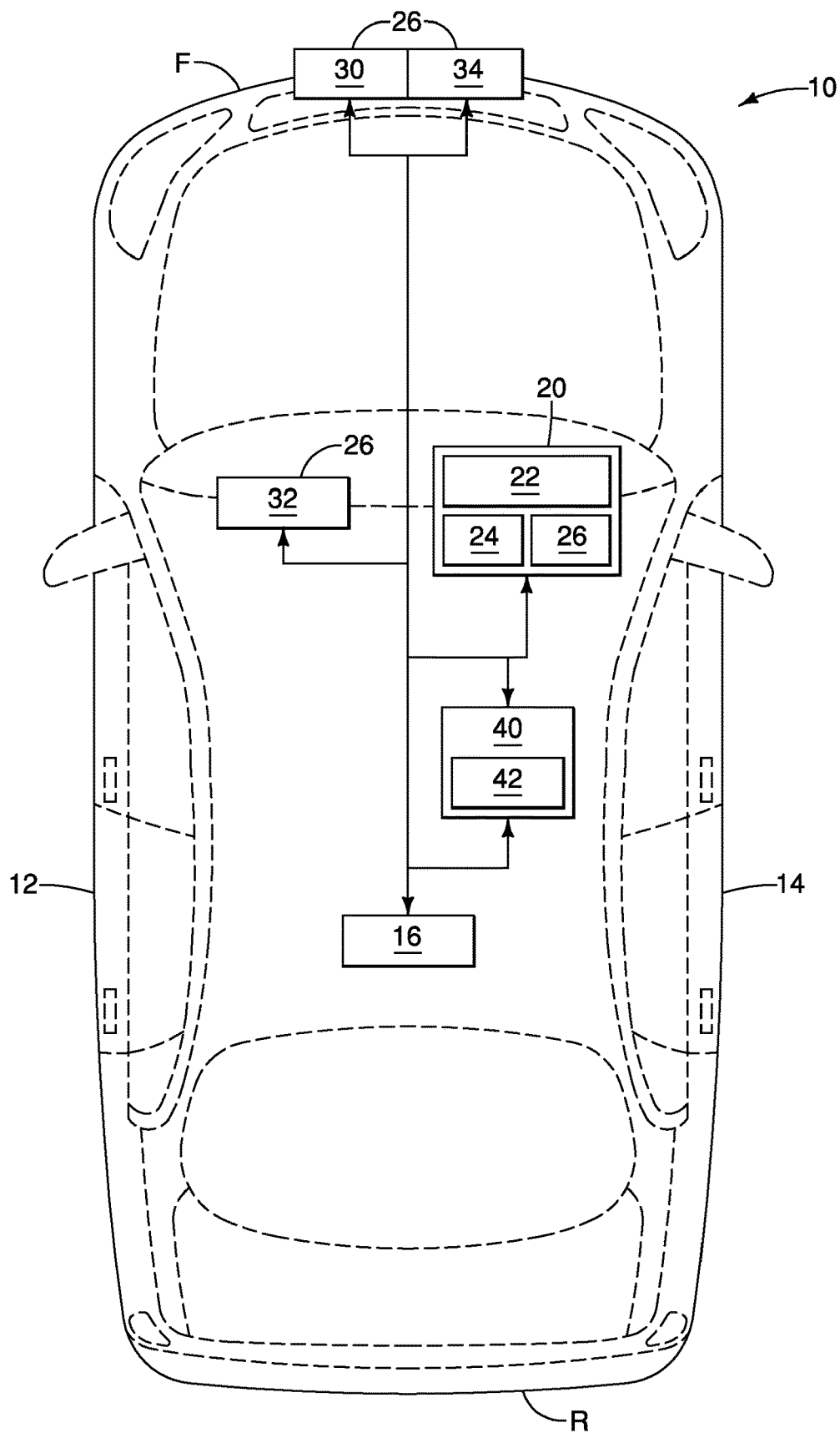
FIG. 1 illustrates a schematic diagram of an example embodiment of a system for assisting with navigation of a vehicle in accordance with the present disclosure.

Referring initially to FIG. 1, a system 10 for assisting with navigation of a vehicle 12 is illustrated in accordance with a first embodiment. In the illustrated embodiment, the system 10 includes a vehicle 12 having a vehicle body 14 and a controller 16. Alternatively, the system 10 can include the controller 16 and/or other components discussed herein and be separate from and in communication with one or more components of the vehicle 12.

The controller 16 preferably includes a microcomputer with a navigation assistance control program that controls a user interface 20 as discussed below. The controller 16 can also include other conventional components such as an input interface circuit, an output interface circuit, and storage devices such as a ROM (Read Only Memory) device and a RAM (Random Access Memory) device. The microcomputer of the controller 16 is programmed to control the user interface 20 and/or other sensors discussed herein. The memory circuit stores processing results and control programs such as ones for navigation assistance operation that are run by the processor circuit. The controller 16 is operatively coupled to the vehicle body 14 in a conventional manner. The internal RAM of the controller 16 stores statuses of operational flags and various control data. The internal ROM of the controller 16 stores the instructions for various operations. The controller 16 is capable of selectively controlling any of the components of the vehicle 12 in accordance with the control program.

The vehicle 12 includes a user interface 20. The user interface 20 includes one or more of a display 22, an input device 24, and an audio device 26. In an embodiment, the display 22 and the input device 24 are part of a graphical user interface such as a touch screen which enables a driver to input and view information regarding various aspects of the vehicle 12. The display 22 is configured to display, for example, directions or alerts generated by the methods discussed herein. In an embodiment, the user interface 20 includes a heads-up unit ("HUD") as known in the art. In another embodiment, the user interface 20 includes an infotainment system as known in the art. In yet another embodiment, the display 22 includes the windshield of the vehicle 12, and the user interface 20 displays various indicators on the windshield of the vehicle 12, as discussed in more detail below. In an embodiment, the audible device 26 includes a speaker which emits audible directions or alerts generated by the methods discussed herein. The audible directions or alerts can be in addition to or alternative to the directions or alerts generated on the display 22.

The vehicle 12 includes one or more sensor 26. In the illustrated embodiment, the one or more sensor 26 includes at least one of a first image sensor 30, a second image sensor 32, and/or a proximity sensor 34. Each one or more sensor 26 is in communication with the controller 16 to transmit detected data to the controller 16 for further processing, as explained in more detail below. It should be understood by those of ordinary skill in the art from this disclosure that different embodiments can include more or less sensors 26 than those that are illustrated in FIG. 1. It should further be understood by those of ordinary skill in the art from this disclosure that one or more sensor 26 can include its own processor and memory that perform some or all of the data processing discussed herein.

Figure 4:
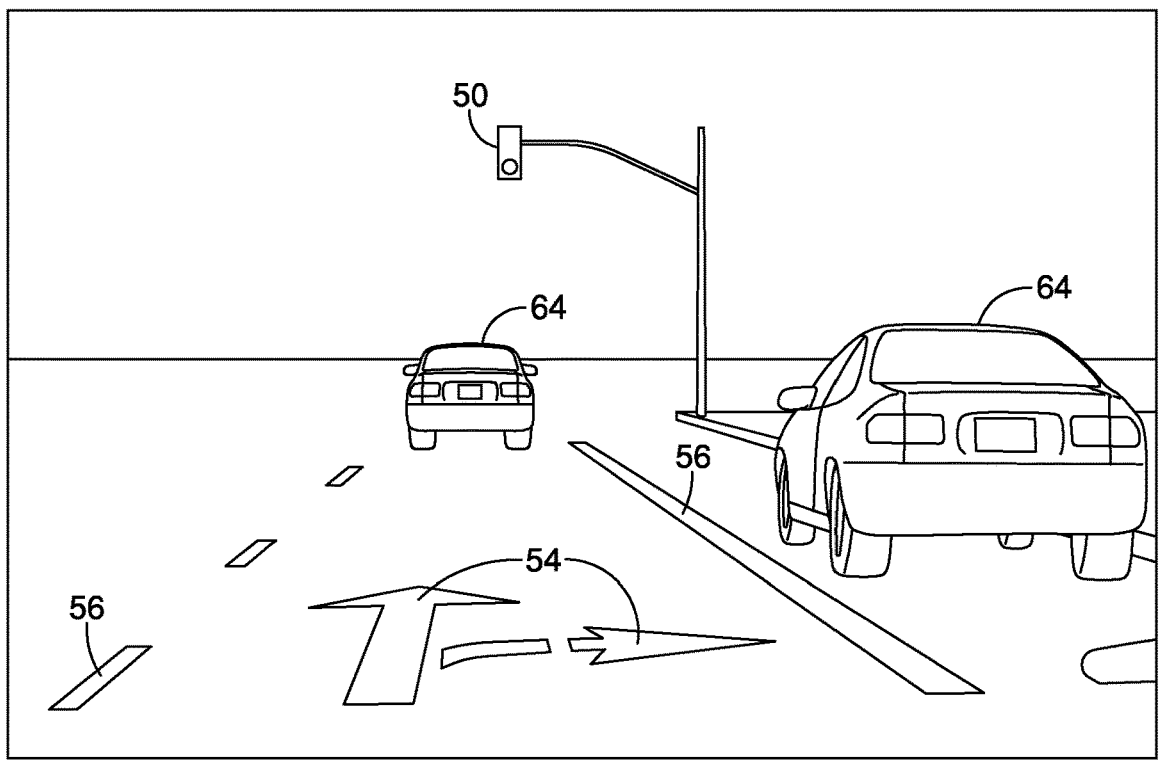
FIG. 4 illustrates an example embodiment of an image which can be viewed from the front end of a vehicle and processed using the systems and methods discussed herein.
Figure 5:
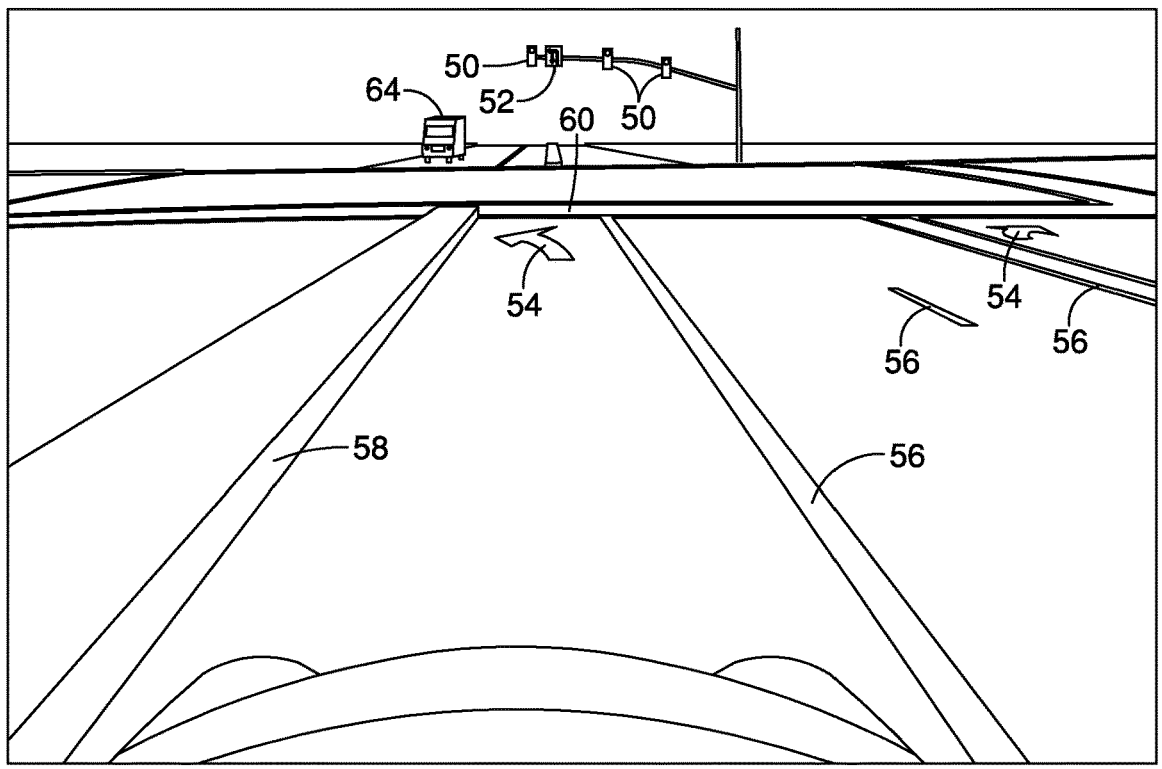
FIG. 5 illustrates another example embodiment of an image which can be viewed from the front end of a vehicle and processed using the systems and methods discussed herein.

In the illustrated embodiment, the one or more sensor 26 includes at least one first image sensor 30. The first image sensor 30 is configured to record data related to the external surroundings of the vehicle 12. In an embodiment, the first image sensor 30 includes a camera that is configured to record one or more image of the external surroundings of the vehicle 12. The images can include still images or video. In the illustrated embodiment, the first image sensor 30 is focused frontward from the front end F of the vehicle 12 and configured to record data related to one or more image of the external surroundings in front of the vehicle 12. FIGS. 4 and 5 illustrate examples of images which might be viewed and/or recorded by the first image sensor 30. In the illustrated embodiment, the first image sensor 30 is located on an external portion of the vehicle body 14 at the front end F of the vehicle body 14. The first image sensor 30 can also be located on other external portions of the vehicle body 14, for example, on the top or side(s) of the vehicle body 14. The first image sensor 30 can also be located internally within the vehicle body 14 and focused externally, for example, through the windshield or another component of the vehicle body 14. The first image sensor 30 can also include a plurality of first image sensors 30 located at various positions around the vehicle body 14.

In the illustrated embodiment, the one or more sensor 26 includes at least one second image sensor 32. The second image sensor 32 is configured to record data related to the driver of the vehicle 12. In an embodiment, the second image sensor 32 includes a camera that is configured to record one or more image of the driver of the vehicle 12. It should be understood by those of ordinary skill in the art from this disclosure that a camera is an optional embodiment of the second image sensor 32. Other types of sensors can also be used. The images can be still images or video. In the illustrated embodiment, the second image sensor 32 is located at or near the dashboard of the vehicle 12 and is focused rearward toward the rear end R of the vehicle 12 to capture the front side of the driver's head. The second image sensor 32 can also be located at other locations and capture the driver from other angles. The second image sensor 32 can also include a plurality of second image sensors 32 located at various positions around the interior of the vehicle body 14. The second image sensor 32 is useful, for example, in accordance with the method 400 discussed below.

In the illustrated embodiment, the one or more sensor 26 includes at least one proximity sensor 34. The proximity sensor 34 is configured to determine the relative distance between the vehicle 12 and various external objects. More specifically, the proximity sensor 34 is configured to determine the relative distance between the front end F of the vehicle 12 and various external objects. In an embodiment, the proximity sensor 34 can also determine the distance between external objects. The proximity sensor 34 can include, for example, a LIDAR sensor which determines the distance of the external object by targeting the distance of the external object with a laser and measuring the time for the reflected light to return to a receiver. For example, the proximity sensor 34 can use the light intensity of street markings to locate the street markings and determine the distance between the street markings and vehicle 12. In various embodiments, the proximity sensor 34 can use light, radar, ultrasonic or other technologies to determine the distance between external objects and the vehicle 12. The proximity sensor 34 can be integrated into or combined with the first image sensor 30, or the proximity sensor 34 can be a separate sensor 26. In the illustrated embodiment, the proximity sensor 34 is focused frontward from the front end F of the vehicle and configured to detect external objects at the front side of the vehicle 12. Here, the proximity sensor 34 is located on an external portion of the vehicle body 14 at the front end F of the vehicle body 14. The proximity sensor 34 can also be located on other external portions of the vehicle body 14, for example, on the top or side(s) of the vehicle body 14. The proximity sensor 34 can also be located internally within the vehicle body 14 and focused externally, for example, through the windshield or another component of the vehicle body 14. The proximity sensor 34 can also include multiple proximity sensors 34 located at different locations around the vehicle body 14 and/or positioned to detect external objects at various angles from the vehicle body 14.

The vehicle 12 includes a navigation system 40. The navigation system 40 can include a GPS device 42 or be placed in communication with a GPS device 42. The GPS device 42 is configured to determine location data regarding the current physical location of the vehicle 12 and communicate the location data to the controller 16 for use in accordance with the methods discussed herein. The GPS device 42 is configured to determine the location data, for example, via communication with one or more global positioning satellite as known in the art. The GPS device 42 can also be configured to determine the location data, for example, via communication with one or more terrestrial units and a base station or external server. In an embodiment, the navigation system 40 is also placed in operative communication with the user interface 20, such that the user interface 20 allows the driver of the vehicle 12 to input (e.g., select) a destination address using the input device 24 and/or audio device 26 and utilize the navigation system 40 to generate route information that is displayed on the display 22. The route information can include an intended route for the vehicle 12.

Figure 2:
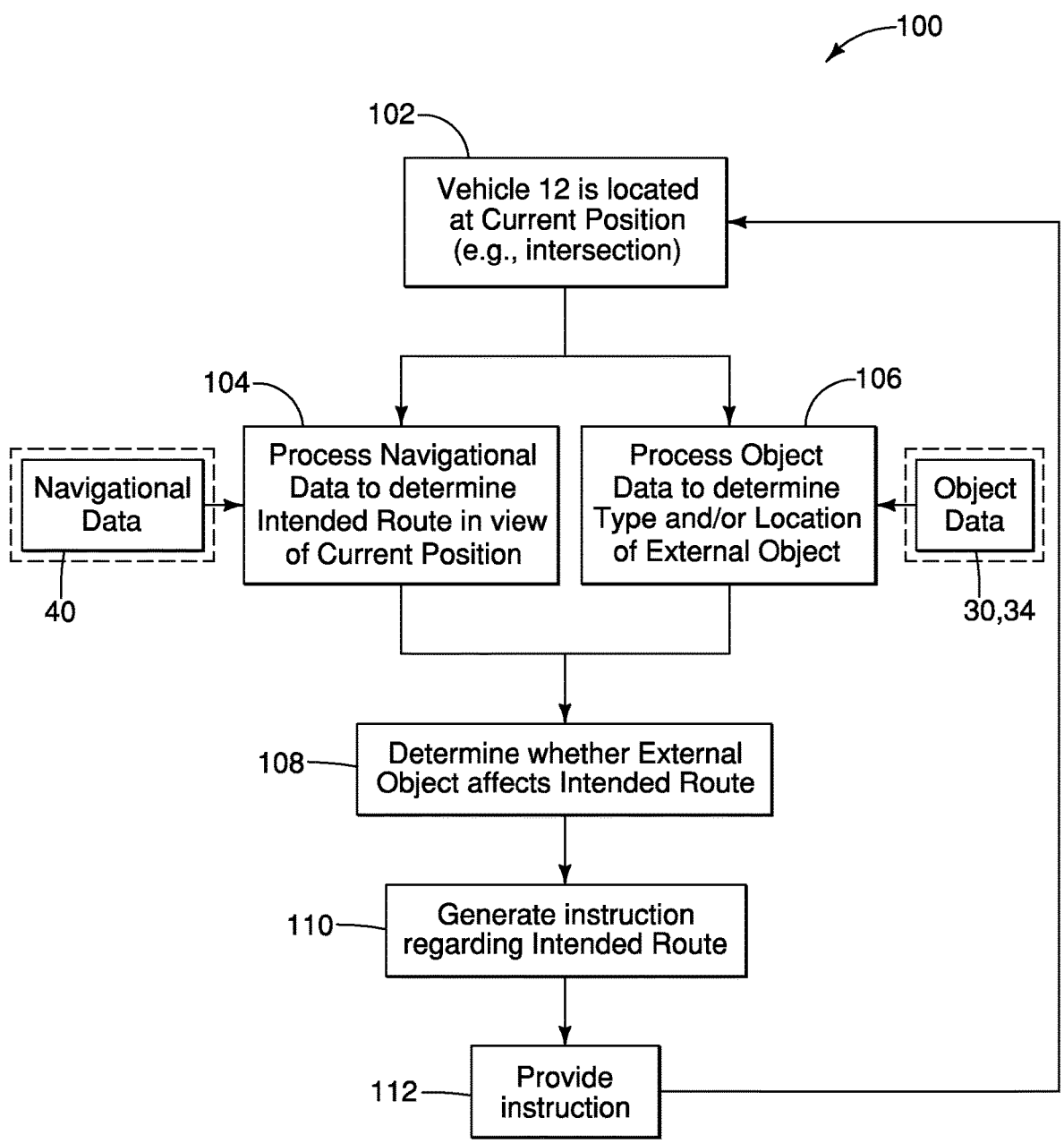
FIG. 2 illustrates an example embodiment of a method for assisting with navigation of a vehicle in accordance with the present disclosure which can be implemented using the system of FIG. 1.

FIG. 2 illustrates an example embodiment of a method 100 for assisting with navigation of a vehicle 12. Some or all of the steps of method 100 can be stored as instructions on the memory of the controller 16 and executed by the processor of the controller 16. Some or all of the steps of method 100 can also be stored as instructions on one or more sensor 26 and executed by a processor of the one or more sensor 26. It should be understood from this disclosure that some of the steps described herein can be reordered or omitted without departing from the spirit or scope of method 100.

At step 102, the vehicle 12 is located at a current position. The current position indicates the physical location of the vehicle 12 at that time. The current position can be at an intersection, for example, as shown in FIGS. 4 and 5. The current position can also be a location along a route that the vehicle 12 is traveling in accordance with route information determined by the navigation system 40. In an embodiment, the current position can be known by the controller 16 after being determined by the navigation system 40 using the GPS device 42.

While at the current position, the one or more sensor 26 detects one or more external object and generates object data based thereon. More specifically, the first image sensor 30 and/or the proximity sensor 34 detects one or more external object and generates object data based thereon. The object data relates to at least one external object detected within a vicinity of the current position of the vehicle 12. The vicinity can be determined by a predetermined distance from the current position. The vicinity can also be determined using the intended route of the vehicle 12. The at least one external object includes at least one of (i) a traffic light 50, (ii) a traffic sign 52, (iii) a lane marking 54, (iv) a lane boundary 56, (v) a curb boundary 58, (vi) a crosswalk 60, (vii) a pedestrian 62, (viii) another vehicle 64, and/or (ix) another external object. Thus, the object data can include data related to one or more of (i) traffic light data related to a traffic light 50, (ii) traffic sign data related to a traffic sign 52, (iii) lane marking data related to a lane marking 54, (iv) lane boundary data related to a lane boundary 56, (v) curb boundary data related to a curb boundary 58, (vi) crosswalk data related to a crosswalk 60, (vii) pedestrian data related to a pedestrian 62, (viii) other vehicle data related to another vehicle 64, and/or (ix) other object data related to another type of external object. In an embodiment, the one or more sensor 26 can determine and/or segregate the type of object data before transmitting the object data to the controller 16. Alternatively, the one or more sensor 26 can transmit the object data to the controller 16 so that the controller 16 can determine and/or segregate the types of external objects and/or types of object data.

At step 104, the controller 16 is configured to receive navigational data relating to an intended route of the vehicle 12. The controller 16 is configured to receive the navigational data from the navigation system 40. The controller 16 is further configured to process the navigational data. The navigational data can include an intended route that has been generated by the navigation system 40. The navigational data can also include a destination address for the vehicle 12. The controller 16 can receive the navigational data before or after the vehicle 12 arrives at the current position. Thus, the controller 16 can receive the navigational data before, during, or after step 102.

The controller 16 is configured to process the navigational data to determine the intended direction of the vehicle 12 from the current position. For example, if the current position is at an intersection as seen in FIGS. 4 and 5, the controller 16 can process the navigational data to determine whether the vehicle 12 intends to proceed straight through the intersection from the current position, turn left at the intersection from the current position, or turn right at the intersection from the current position.

At step 106, the controller 16 is configured to receive object data relating to at least one external object detected within a vicinity of a current position of the vehicle 12. The controller 16 is configured to receive the object data from one or more sensor 26. More specifically, the controller 16 is configured to receive the object data from the first image sensor 30 and/or the proximity sensor 34. The controller 16 is further configured to process the object data. More specifically, the controller 16 is configured to process the object data to determine a shape and/or location of the at least one external object based on the object data. The controller is configured to then use the shape and/or location to identify the external object. The object data includes information relating to one or more external object detected by the one or more sensor 26. More specifically, the object data includes information relating to a location and/or type of one or more external object detected by the one or more sensor 26. In an embodiment, the object data can be distinguished as one or more of (i) traffic light data related to a traffic light 50, (ii) traffic sign data related to a traffic sign 52, (iii) lane marking data related to a lane marking 54, (iv) lane boundary data related to a lane boundary 56, (v) curb boundary data related to a curb boundary 58, (vi) crosswalk data related to a crosswalk 60, (vii) pedestrian data related to a pedestrian 62, (viii) other vehicle data related to another vehicle 64, and/or (ix) other object data related to another type of external object.

The controller 16 is configured to determine the type of one or more external object in the vicinity of the vehicle 12 using the object data. The external object can be, for example, (i) a traffic light 50, (ii) a traffic sign 52, (iii) a lane marking 54, (iv) a lane boundary 56, (v) a curb boundary 58 (*vi*) a crosswalk 60, (vii) a pedestrian 62, (viii) another vehicle 64, and/or (ix) another external object. The type of external object can be determined based on object data received from the first image sensor 30. The controller 16 is also configured to determine the location of one or more external object in the vicinity of the vehicle 12 using the object data. The location of the one or more external object can be a location in relation to the vehicle 12, for example, as determined by the first image sensor 30 and/or proximity sensor 34. The location can also include whether or not the external object is located within the vehicle's current lane. The vicinity of the vehicle 12 can be determined by a predetermined distance from the vehicle's current position. The vicinity can also be determined using the intended route of the vehicle 12. An example embodiment of a method 200 that the controller 16 can use to determine the location and/or type of one or more external object in the vicinity of the vehicle 12 is discussed in more detail below.

At step 108, the controller 16 is configured to determine whether at least one detected external object affects an ability of the vehicle 12 to proceed along the intended route. The determination can include a determination of whether an external object currently blocks the intended route of the vehicle 12. The determination can also include a determination of whether an external object will interfere with the intended route of the vehicle 12 in the future. The determination can also include a determination of whether the current position of the vehicle 12 is proper for proceeding along the intended route. The determination can also include a determination of the vehicle's current lane.

In an embodiment, the controller 16 is configured to determine the current lane of the vehicle 12 based on one or more external object. More specifically, the controller is configured to determine the current lane of the vehicle 12 using street markings and curbs, for example, the lane boundaries 56 and/or curb boundaries 58 discussed herein. In cases where a street does not include visible lane markings, the controller 16 is configured to determine the current lane by determining the size of the street and calculating the number and position of lanes in the street based thereon.

In one embodiment, the controller 16 determines at step 106 that a detected external object is a traffic light 50. The controller 16 is configured to determine that a detected object is a traffic light 50 based on the shape, color and/or location of the traffic light. The controller 16 is further configured to determine the state of the traffic light (e.g., red, yellow, green, or including an arrow) using color or shape recognition once determining that the external object is a traffic light 50. At step 108, the controller 16 determines whether the traffic light 50 affects an ability of the vehicle 12 to proceed along the intended route. For example, the controller 16 determines whether a signal of the traffic light 50 allows the vehicle 12 to proceed through an intersection in an intended direction along the intended route from the current position. More specifically, the controller 16 determines whether the traffic light 50 allows the vehicle 12 to proceed along the intended route from the current position in the determined current lane.

In another embodiment, the controller 16 determines at step 106 that a detected external object is a traffic sign 52. The traffic sign 52 can be, for example, a stop sign, a yield sign, a turn only sign, or another type of sign. The controller 16 is configured to determine that a detected object is a traffic sign 52 based on the shape, color and/or location of the traffic sign 52. At step 108, the controller 16 determines whether the traffic sign 52 affects an ability of the vehicle 12 to proceed along the intended route. The controller 16 is configured to determine that the vehicle 12 is located within a wrong lane to proceed along the intended route. For example, the controller 16 determines whether the traffic sign 52 indicates that the vehicle 12 can legally proceed along the intended route from its current position. More specifically, the controller 16 determines whether a traffic sign 52 allows the vehicle 12 to proceed along the intended route from the current position in the determined current lane.

In another embodiment, the controller 16 determines at step 106 that a detected external object is a lane marking 54. The lane marking 54 can be, for example, an arrow indicating the direction that the vehicle 12 can turn from a lane. The controller 16 is configured to determine that a detected object is a lane marking 54 based on the shape, location and/or light intensity of the lane marking. The controller 16 is also configured to determine whether the lane marking 54 is in the same lane as the vehicle 12 or a different lane as the vehicle 12, for example, by considering the position of the lane marking 54 in view of the vehicle 12, a detected lane boundary 56 and/or a detected curb boundary 58. At step 108, the controller 16 determines whether the lane marking 54 affects an ability of the vehicle 12 to proceed along the intended route. The controller 16 is configured to determine that the vehicle 12 is located within a wrong lane to proceed along the intended route. More specifically, the controller 16 determines the current lane corresponding to the vehicle 12 and further determines whether the vehicle 12 is located in the appropriate lane to proceed along the intended route. For example, if the intended route calls for the vehicle 12 to proceed straight, but the vehicle 12 is in a right turn lane as designated by a lane marking 54, then the vehicle 12 cannot proceed along the intended route.

In another embodiment, the controller 16 determines at step 106 that a detected external object is a lane boundary 56. The lane boundary 56 can be, for example, a solid or dashed lane boundary. The controller 16 is configured to determine that a detected object is a lane boundary 56 based on the shape, location and/or light intensity of the lane boundary. The controller 16 is also configured to determine whether the lane boundary 56 marks the current lane of the vehicle 12 or a different lane, for example, by considering the position of the lane marking 54 in view of the vehicle 12 and/or another detected lane boundary 56 or curb boundary 58. At step 108, the controller 16 determines whether the lane boundary 56 affects an ability of the vehicle 12 to proceed along the intended route. The controller 16 is configured to determine that the vehicle 12 is located within a wrong lane to proceed along the intended route. More specifically, the controller 16 determines the current lane corresponding to the vehicle 12 based on one or more lane boundary 56 and determines whether the vehicle 12 can proceed along the intended route while remaining within its current lane.

In another embodiment, the controller 16 determines at step 106 that a detected external object is a curb boundary 58. The controller 16 is configured to determine that a detected object is a curb boundary 58 based on the shape, size and/or light intensity of the curb boundary. The controller 16 is also configured to determine whether the curb boundary 58 marks the current lane of the vehicle 12 or a different lane, for example, by considering the position of the curb boundary 58 in view of the vehicle 12 and/or another detected lane boundary 56 or curb boundary 58. At step 108, the controller 16 determines whether the curb boundary 58 affects an ability of the vehicle 12 to proceed along the intended route. More specifically, the controller 16 determines the current lane corresponding to the vehicle 12 based on the curb boundary 58 and determines whether the vehicle 12 can proceed along the intended route while remaining within its current lane. The curb boundary detection is also particularly useful in combination with detection of a pedestrian 62, as discussed in more detail below.

In another embodiment, the controller 16 determines at step 106 that a detected external object is a crosswalk 60. The controller 16 is configured to determine that a detected object is a crosswalk 60 based on the shape and/or light intensity of the crosswalk. At step 108, the controller 16 determines whether the crosswalk 60 affects an ability of the vehicle 12 to proceed along the intended route. For example, the vehicle 12 may need to stop in view of the crosswalk 60 or a pedestrian 62 potentially proceeding along the crosswalk. An example embodiment of a method 300 that determines whether a crosswalk 60 will affect an ability of the vehicle 12 to proceed along the intended route is described in more detail below.

In another embodiment, the controller 16 determines at step 106 that a detected external object is a pedestrian 62. The controller 16 is configured to determine that a detected object is a pedestrian 62 based on the shape, size, orientation and/or movement of the pedestrian. At step 108, the controller 16 determines whether the pedestrian 62 affects an ability of the vehicle 12 to proceed along the intended route. The controller 16 is configured to determine whether the pedestrian 62 currently blocks the intended route of the vehicle 12 or is likely to move in front of the vehicle 12. The controller 16 is also configured to determine whether the pedestrian 62 has an intended path that interferes with the intended route of the vehicle 12. An example embodiment of a method 300 that determines whether a pedestrian 62 will affect an ability of the vehicle 12 to proceed along the intended route is described in more detail below.

In another embodiment, the controller 16 determines at step 106 that a detected external object is another vehicle 64. The controller 16 is configured to determine that a detected object is another vehicle 64 based on the shape, size and/or movement of the other vehicle. At step 108, the controller 16 determines whether the other vehicle 64 affects an ability of the vehicle 12 to proceed along the intended route. More specifically, the controller 16 determines whether the other vehicle 64 currently blocks the intended route of the vehicle or is likely to move in front of the vehicle 12.

The determination made by the controller 16 at step 108 can include multiple of the above-described determinations or other determinations. For example, FIG. 3 illustrates and example embodiment of a method 100*a* in which multiple external objects have been detected and processed.

At step 110, the controller 16 generates at least one instruction relating to the ability of the vehicle 12 to proceed along the intended route. The instruction can include an instruction that the vehicle 12 should proceed along the intended route from the current position. The instruction can include an instruction that the vehicle 12 should proceed within the current lane. The instruction can include an instruction that the vehicle 12 should change to a different lane. The instruction can include an instruction that the driver and/or navigation system 40 should generate a new route.

At step 112, the controller 16 provides the instruction to cause the vehicle 12 to change the intended route or proceed along the intended route, for example, by action of the driver. The instruction can be provided to the user interface 20 to cause the user interface 20 to provide a visual instruction to the driver via the display 22 and/or an audible instruction to the driver via the audible device 26. The visual and/or audible instruction can instruct the driver, for example, to proceed in the current lane, change to a different lane, or stop in view of an external object which is likely to obstruct the vehicle 12. The instruction can also be provided to the navigation system 40 to cause the navigation system 40 to generate a new intended route.

Figure 3:
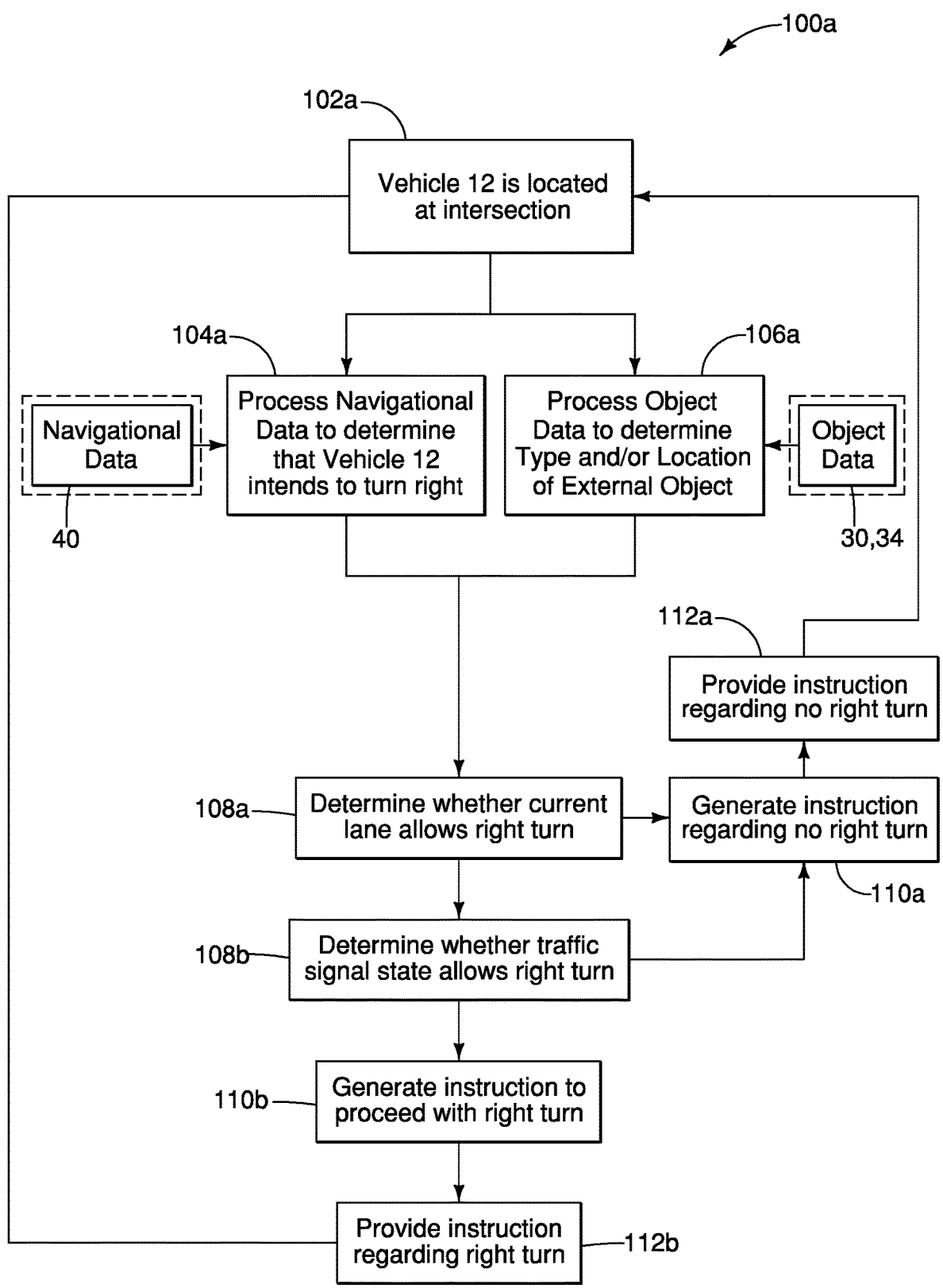
FIG. 3 illustrates an example embodiment of the method of FIG. 2.

FIG. 3 illustrates a method 100*a* which is an example embodiment of method 100. At step 102*a*, the controller 16 determines the current position of the vehicle 12 to be at an intersection. At step 104*a*, the controller 16 determines that the vehicle 12 intends to turn right at the intersection to proceed along the intended route. At step 106*a*, the controller 16 processes object data to locate external objects sufficient to identify the vehicle's current lane, the traffic signals which relate to the vehicle's current lane, and/or external objects which may block the right turn path of the vehicle 12.

At step 108*a*, the controller 16 determines whether the current lane of the vehicle 12 allows the vehicle 12 to make a right turn through the intersection from the current position. More specifically, the controller 16 determines the current lane, for example, using object data related to a detected lane boundary 56 and/or curb boundary 58. The controller 16 then determines whether the vehicle 12 can turn right from the current lane, for example, using object data related to a detected traffic light 50, traffic sign 52 and/or lane marking 54. The controller 16 is configured to further determine whether a pedestrian 62, another vehicle 64 and/or another external object blocks the path of the vehicle 12.

If the controller 16 determines that the vehicle 12 cannot make a right turn from the current lane at step 108*a*, then the controller 16 generates a corresponding instruction at step 110*a* and provides that instruction at step 112*a*. At step 112*a*, the instruction can be provided, for example, via a visual and/or audible instruction that instructs the driver to change lanes, and/or via an instruction which causes the navigation system to generate a new intended route that does not include the right turn.

If the controller 16 determines that the vehicle 12 can make a right turn from the current lane at step 108*a*, then the controller 16 proceeds to step 108*b*. At step 108*b*, the controller 16 determines whether the traffic signal state allows the vehicle 12 to make the right turn through the intersection from the current position. More specifically, the controller 16 determines the traffic signal state, for example, using information related to a detected traffic signal 50 (e.g., whether the traffic signal 50 is red, yellow, green, or including an arrow). In an embodiment, the controller 16 can also determine the traffic signal state, for example, using information related to a detected traffic sign 52 (e.g., whether the vehicle 12 must stop for a stop sign or yield for a yield sign). The controller 16 is configured to further determine whether a pedestrian 62, another vehicle 64 and/or another external object blocks the path of the vehicle 12.

If the controller 16 determines that the vehicle 12 cannot make a right turn from the current lane at step 108*b* based on the traffic signal state, then the controller 16 generates a corresponding instruction at step 110*a* and provides that instruction at step 112*a*. If the controller 16 determines that the vehicle 12 can make a right turn from the current lane at step 108*b*, then the controller generates a corresponding instruction at step 110*b* and provides that instruction at step 112*b*. At step 112*b*, the instruction may be provided, for example, via a visual and/or audible instruction that instructs the driver to proceed to turn right.

FIG. 4 illustrates an example embodiment of an image which can be viewed from the front end F of the vehicle 12 and processed by one or more sensor 26 and/or the controller 16 in accordance with the methods discussed herein. From the position shown in FIG. 4, the one or more sensor 26 is configured to detect a traffic light 50, a lane marking 54, lane boundaries 56 and other vehicles 64. The controller 16 is configured to use the detected lane boundaries 56 to determine the current lane of the vehicle 12 and/or other lanes. The controller 16 is configured to use the detected lane marking 54 to determine that the vehicle 12 can proceed straight or turn right from the current lane. The controller 16 is configured to use the detected other vehicles 64 to avoid obstructions.

FIG. 5 illustrates another example embodiment of an image which can be viewed from the front end F of the vehicle 12 and processed by one or more sensor 26 and/or the controller 16 in accordance with the methods discussed herein. From the position shown in FIG. 5, the one or more sensor 26 is configured to detect a traffic light 50, a traffic sign 52, lane markings 54, lane boundaries 56, curb boundaries 58, a crosswalk 60, and other vehicles 64. The controller 16 is configured to use the detected lane boundaries 56 and curb boundaries 58 to determine the current lane of the vehicle 12 and/or other lanes. The controller 16 is configured to use the detected lane markings 54 and/or traffic sign 52 to determine that the vehicle 12 can proceed left from the current lane. The controller 16 is configured to use the detected other vehicles 64 to avoid obstructions. The controller 16 is configured to use the detected crosswalk 60 as a lane boundary and/or or in accordance with method 300 discussed below.

Figure 6:
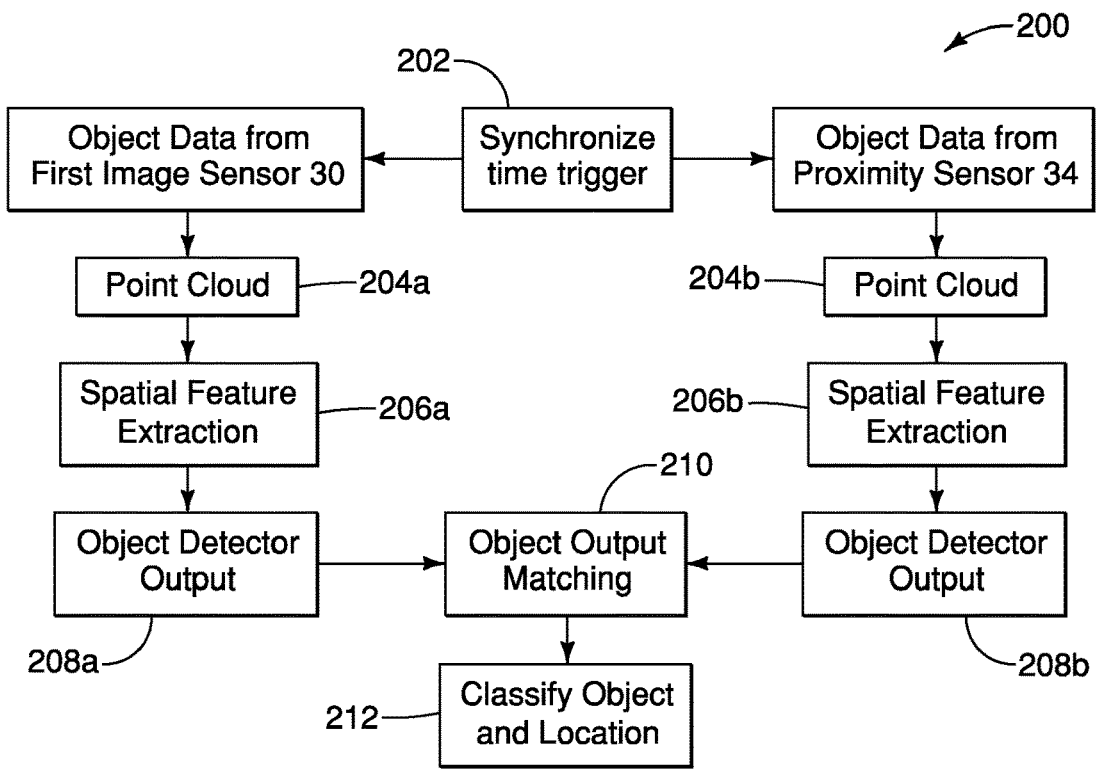
FIG. 6 illustrates an example embodiment of a method for processing object data to assist with navigation of a vehicle using the systems and methods discussed herein.

FIG. 6 illustrates an example method 200 of how the controller 16 can be configured to processes object data at step 106 of method 100. Some or all of the steps of method 200 can be stored as instructions on the memory of the controller 16 and executed by the processor of the controller 16. Some or all of the steps of method 200 can be stored as instructions on one or more sensor 26 and executed by a processor of the one or more sensor 26. It should be understood from this disclosure that some of the steps described herein can be reordered or omitted without departing from the spirit or scope of method 200.

At step 202, the controller 16 is configured synchronize one or more sensor 26 with a time trigger. More specifically, first object data from the first image sensor 30 and second object data from the proximity sensor 34 can be synchronized, for example, by time stamping the first object data and the second object data using a time trigger.

At step 204*a*, the controller 16 is configured to create or modify a first point cloud using a data stream of the first object data from the first image sensor 30. More specifically, the images from the first object data can be registered geometrically via the first point cloud. The first point cloud can include a set of data points in space, with each point having a set of coordinates. At step 204*b*, the controller 16 is configured to create or modify a second point cloud using the second object data from the proximity sensor 34. The second point cloud can also include a set of data points in space, with each point having a set of coordinates.

At step 206*a*, the controller 16 is configured to process the first point cloud using spatial feature extraction. For example, the first point cloud can be processed with a neural network (e.g., a convolutional neural network) to extract the spatial features of the first point cloud. At step 206*b*, the controller 16 is configured to process the second point cloud using spatial feature extraction. For example, the second point cloud can be processed with a neural network (e.g., a convolutional neural network) to extract the spatial features of the second point cloud.

At step 208*a*, the controller 16 is configured to process the first point cloud, after spatial feature extraction, to detect and output first objects. More specifically, the controller 16 is configured to use object bounding (e.g., object bounding boxes) and/or confidence levels to output first objects. At step 208*b*, the controller 16 is configured to process the second point cloud, after spatial feature extraction, to detect and output second objects. More specifically, the controller 16 is configured to use object bounding (e.g., object bounding boxes) and/or XYZ locations to output second objects.

At step 210, the controller 16 is configured to match the first object outputs corresponding to the first object data with the second object outputs corresponding to the second output data. More specifically, the first object outputs can be compared to the second object outputs using the determined locations, time synchronization, and/or other matching elements.

At step 212, the controller 16 is configured to classify the object type and location. The controller 16 is configured to classify the object type, for example, based on the shape and relative location to other external objects and/or the vehicle 12. The controller 16 is configured to classify the object type as, for example, (i) a traffic light 50, (ii) a traffic sign 52, (iii) a lane marking 54, (iv) a lane boundary 56, (v) a curb boundary 58 (vi) a crosswalk 60, (vii) a pedestrian 62, (viii) another vehicle 64, and/or (ix) another external object.

Figure 7:
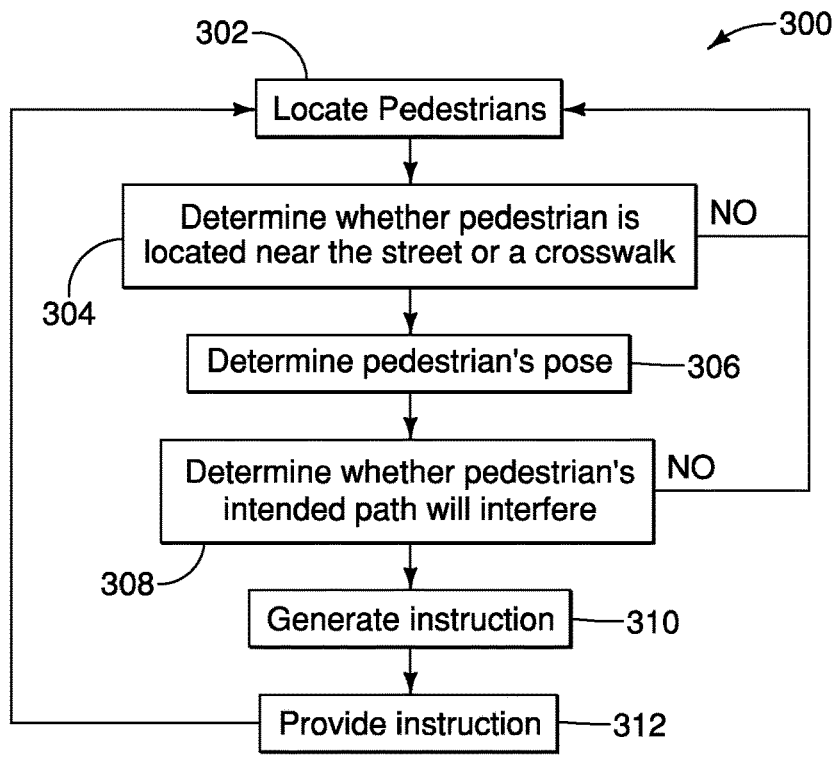
FIG. 7 illustrates another example embodiment of a method for assisting with navigation of a vehicle in accordance with the present disclosure which can be implemented using the system of FIG. 1.

FIG. 7 illustrates an example embodiment of a method 300 which can be performed when the controller 16 determines that an external object is a pedestrian 62 during method 100. Method 300 can also be performed by the controller 16 independently of the other methods discussed herein. Some or all of the steps of method 300 can be stored as instructions on the memory of the controller 16 and executed by the processor of the controller 16. Some or all of the steps of method 300 can be stored as instructions on one or more sensor 26 and executed by a processor of the one or more sensor 26. It should be understood from this disclosure that some of the steps described herein can be reordered or omitted without departing from the spirit or scope of method 300.

At step 302, the controller 16 is configured to locate one or more pedestrians 62 within a vicinity of a current position of the vehicle 12. The controller 16 can locate one or more pedestrians 62 by receiving pedestrian data regarding a pedestrian 62 detected within a vicinity of a current position of the vehicle 12. The pedestrian data can be object data received from one or more sensor 26. The pedestrian data can relate to a single pedestrian 62 or multiple pedestrians 62 within the vicinity of the vehicle 12. The vicinity of the vehicle 12 can be determined by a predetermined distance from the current location of the vehicle 12. The vicinity can also be determined using the intended route of the vehicle 12, for example, based on pedestrians 62 who are within a vicinity of the vehicle's intended route.

At step 304, the controller 16 is configured to determine whether a pedestrian 62 is located near the street and/or a crosswalk. The controller 16 can determine whether a pedestrian 62 is located near the street by determining whether the pedestrian 62 is within a predetermined distance of a detected curb boundary 58. Alternatively or additionally, the controller 16 is configured to determine whether the pedestrian 62 is near or within a detected crosswalk 60. The controller 16 can determine whether a pedestrian 62 is located near or within a crosswalk 60 by determining whether the pedestrian 62 is within a predetermined distance of a detected crosswalk 60. The controller 16 is configured to determine the curb boundary 58 or the crosswalk 60 using object data as discussed herein. If no pedestrian is detected near the street or a crosswalk 60, the controller 16 returns to step 302 and receives pedestrian data for additional pedestrians who may have moved within the vicinity of the current position of the vehicle 12. In another embodiment, the controller 16 is configured to determine whether the pedestrian 62 is near or within a detected lane boundary 56 of the current lane of the vehicle 12.

Figure 8:
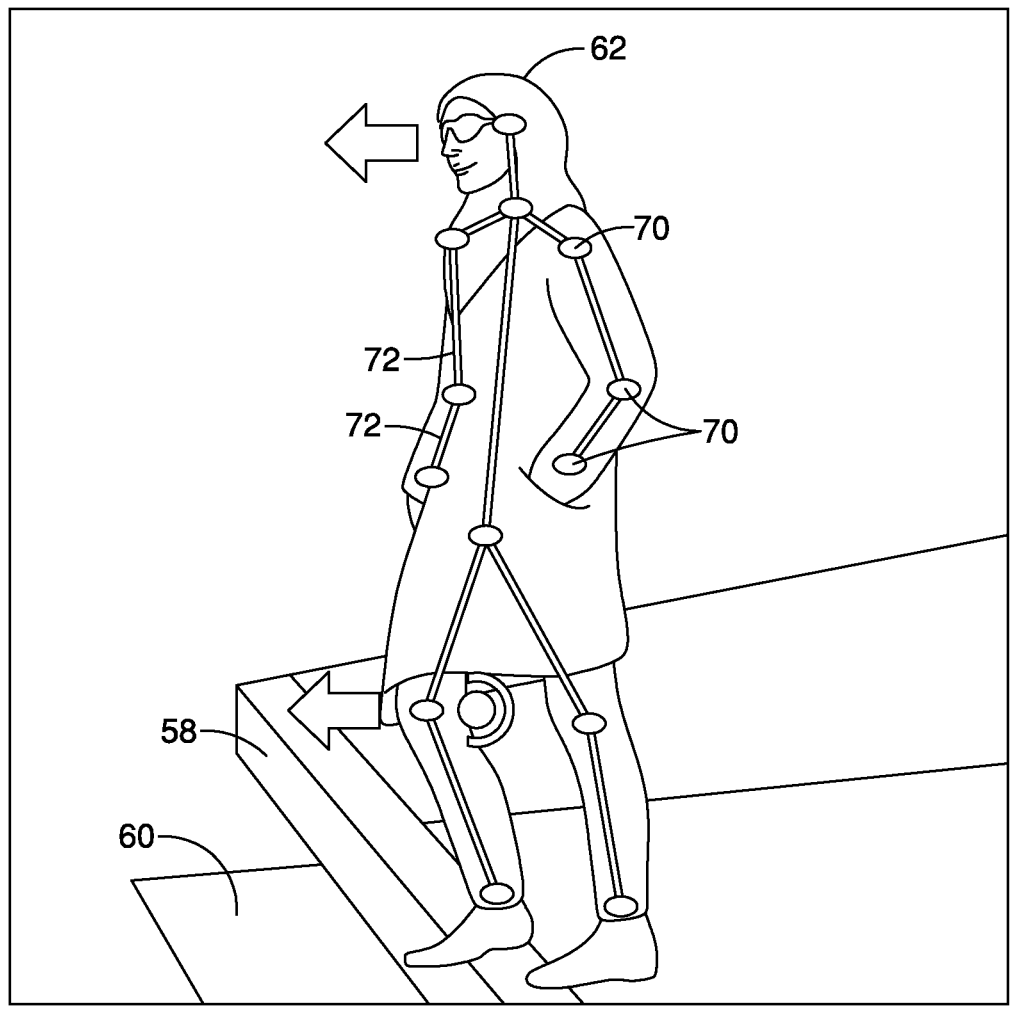
FIG. 8 illustrates another example embodiment of an image which can be viewed from the front end of a vehicle and processed using the systems and methods discussed herein.

At step 306, the controller 16 is configured to determine the pose of one or more pedestrian 62. More specifically, the controller 16 is configured to determine the pose of one or more pedestrian 62 who has been determined to be near the street or the crosswalk 60 at step 304. FIG. 8 illustrates an example embodiment of a method that the controller 16 can be configured to use to determine the pose of a pedestrian 62. As illustrated, an image of a pedestrian 62 can be used to create or modify a point cloud comprising a plurality of points 70 and/or vectors 72. The controller 16 is configured to process the point cloud, for example using a neural network, to determine the pose of the pedestrian 62. The determined pose can include the direction that the pedestrian is facing. The determined pose can also include whether the pedestrian 62 is walking or intending to walk.

In an embodiment, the controller 16 is configured to use a pose algorithm to determine the pose of the pedestrian 62. The pose algorithm can use a neural network to detect key parts of the body of the pedestrian and part affinity fields ("PAF"). In this embodiment, the key parts are matched based on the PAF to obtain the skeleton of the pedestrian 62 as shown in FIG. 8. The matching can be bipartite matching. In an embodiment, the controller 16 is configured to use a bottom-up method in which the controller 16 analyzes the skeleton of the pedestrian 62 from the bottom up. Thus, in an embodiment, the controller 16 (i) receives an input image of a pedestrian (e.g., via the first image sensor 30), (ii) creates a part confidence map, (iii) creates a part affinity field, (iv) matches the part confidence map with the part affinity field (e.g., using bipartite matching), and (v) parses the results to obtain the skeleton of the pedestrian 62 to determine the pose.

At step 308, the controller 16 is configured to determine an intended path of the pedestrian 62. More specifically, the controller 16 is configured to determine an intended walking direction of the pedestrian. The controller 16 is configured to determine the intended path based on the detected pose of the pedestrian 62. For example, the controller 16 is configured to determine whether the pedestrian 62 is facing the street or the crosswalk 60 based on the determined pose of the pedestrian 62. In an embodiment, the controller 16 is further configured to determine whether the pedestrian 62's arms, legs and/or other body positioning indicates a walking motion or an intention to walk.

Using the determined intended path, the controller 16 is configured to determine whether the intended path of the pedestrian interferes with an intended route of the vehicle 12. More specifically, the controller 16 is configured to determine an intended path of the pedestrian 62 based on the pose and/or the relation of the pedestrian 62 in comparison to the street or the crosswalk 60. For example, if the pedestrian 62 is facing a crosswalk 60, the controller 16 is configured to determine that the pedestrian 62 intends to walk across the crosswalk 60. In another embodiment, if the pedestrian 62 is facing the street from near a curb boundary 58, even in the absence of a crosswalk 60, the controller 16 is configured to determine that the pedestrian 62 intends to walk across the street. The controller 16 can also account for the arm or leg positions determined from the pose of the pedestrian 62. If the pedestrian 62 is not determined to interfere with the intended path of the vehicle 12, the controller 16 returns to step 302 and receives data for additional pedestrians 62 who may have moved within the vicinity of the current position of the vehicle 12.

At step 310, the controller 16 generates at least one instruction relating to the ability of the vehicle 12 to proceed along the intended route. More specifically, the controller generates at least one instruction when the intended path of the pedestrian 62 is determined to interfere with the intended route of the vehicle 12. The instruction can include an instruction that the vehicle 12 should proceed along the intended route from the current position. The instruction can include an instruction that the vehicle 12 should proceed within the current lane. The instruction can include an instruction that the vehicle 12 should change to a different lane. The instruction can include an instruction that the driver and/or navigation system 40 should generate a new route.

At step 312, the controller 16 provides the instruction to cause the vehicle 12 to change the intended route or proceed along the intended route, for example, by action of the driver. The instruction can be provided to the user interface 20 to cause the user interface 20 to provide a visual instruction to the driver via the display 22 and/or an audible instruction to the driver via the audible device 26. The visual and/or audible instruction can instruct the driver of the presence of a pedestrian 62. The visual and/or audible instruction can instruct the driver of the intended path of a pedestrian 62. The visual and/or audible instruction can instruct the driver, for example, to proceed in the current lane, change to a different lane, or stop in view of a pedestrian 62 who is likely to obstruct the vehicle 12. The instruction can be provided to the navigation system 40 to cause the navigation system to generate a new intended route.

Figure 9:
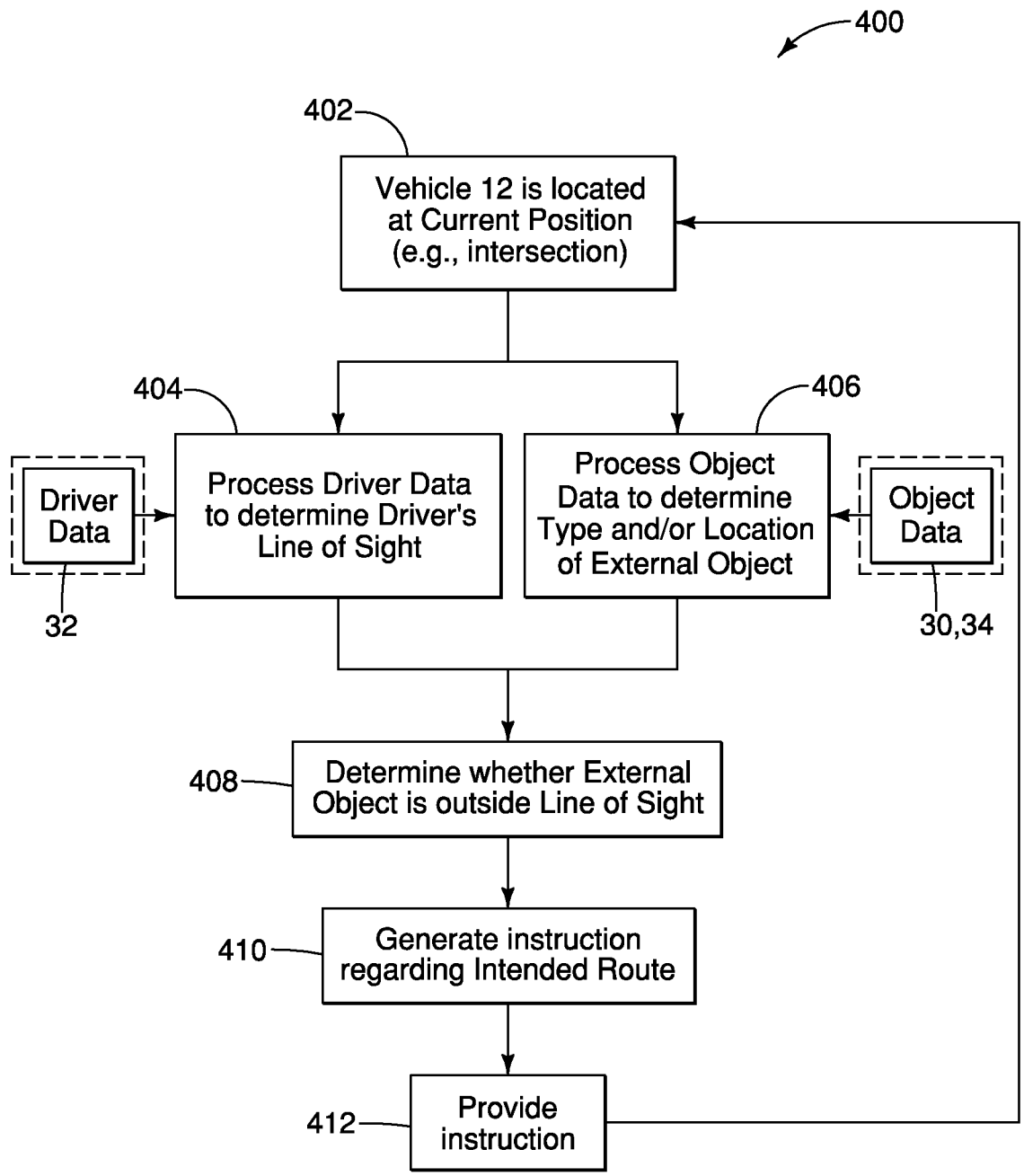
FIG. 9 illustrates another example embodiment of a method for assisting with navigation of a vehicle in accordance with the present disclosure which can be implemented using the system of FIG. 1.

FIG. 9 illustrates an example embodiment of a method 400 which utilizes the second image sensor 32. Method 400 can be performed independently of or in combination with the other methods discussed herein. Some or all of the steps of method 400 can be stored as instructions on the memory of the controller 16 and executed by the processor of the controller 16. Some or all of the steps of method 400 can be stored as instructions on one or more sensor 26 and executed by a processor of the one or more sensor 26. It should be understood from this disclosure that some of the steps described herein can be reordered or omitted without departing from the spirit or scope of method 400.

At step 402, the vehicle 12 is located at a current position as discussed herein. While at the current position, the second image sensor 32 records one or more image of the driver and generates driver data. The first image sensor 30 and/or the proximity sensor 34 likewise generate object data as discussed herein.

At step 404, the controller 16 receives driver data relating to the driver of the vehicle. The driver data can include sight data related to a current line of sight detected for a driver of the vehicle 12. The controller 16 is configured to determine the driver's line of sight using the sight data. More specifically, the controller 16 is configured to use the sight data to determine the driver's head pose and gaze direction. The driver's head pose includes the direction that the driver's head is turned. The driver's gaze direction includes the direction that the driver's eyes are pointing, for example, in relation to the driver's face. Based on the driver's head pose and/or gaze direction, the controller 16 is configured to calculate a probable line of sight for the driver. Alternatively or additionally, the controller 16 is configured to determine the driver's attention level based on the sight data. The attention level can be based, for example, on how often or quickly the driver is moving his or her head or eyes.

In an embodiment, the controller 16 includes a head pose module and a gaze estimation module. The controller 16 can separately direct the driver data to each of the head pose module and the gaze estimation module. The controller 16 is configured to use the head pose module to determine the direction that the driver's head is turned. The head pose module can further determine the driver's attention level, for example, based on how often or quickly the driver moves his or her head. The controller 16 is configured to use the gaze estimation module to determine the direction that the driver's eyes are pointing, for example, in relation to the driver's face. The gaze estimation module can further determine the driver's attention level, for example, based on how often or quickly the driver moves his or her eyes. The controller 16 can further include a command interpreting module which merges the results of the head pose module and the gaze estimation module to determine the driver's line of sight, for example, based the driver's eye position and head position.

In an embodiment, the controller 16 is configured to run an appearance-based gaze estimation algorithm to detect the driver's line of sight. The appearance-based gaze estimation algorithm can include use of a neural network. The neural network can be a multimodal convolutional neural network. The controller 16 is configured to extract the driver's head pose and eyes using the neural network. The controller 16 then outputs the driver's line of sign as the gaze direction in 3D space. The line of sight can be defined, for example, by one or more points or vectors relative to the driver or vehicle 12.

At step 406, the controller 16 receives and processes object data as discussed herein. In an embodiment, the controller 16 can receive and process object data simultaneously with the determination of the driver's line of sight at step 404. In another embodiment, the controller 16 can first determine the driver's line of sight and then process the object data based on the determined line of sight. For example, the controller 16 can first determine the driver's line of sight and then process the object data that is outside of the determined line of sight.

At step 408, the controller 16 determines whether at least one external object is outside of the current line of sight of the driver. For example, if the controller 16 determines that the driver's line of sight is pointing towards the left corner of the vehicle 12, the controller 16 determines whether any external objects such as pedestrians 62 or other vehicles 64 are located near the right corner of the vehicle 12. The controller can also determine whether there are any other objects such as a traffic light 50, a traffic sign 52, a lane marking 54, a lane boundary 56, a curb boundary 58, or a crosswalk 60 are located outside of the determined line of sight.

At step 410, the controller 16 generates at least one instruction relating to the external object. More specifically, the controller generates at least instruction based on an external object detected outside of the driver's line of sight. The instruction can include an instruction that the vehicle 12 should stop. The instruction can include an instruction that the vehicle 12 should proceed along the intended route from the current position. The instruction can include an instruction that the vehicle 12 should proceed within the current lane. The instruction can include an instruction that the vehicle 12 should change to a different lane. The instruction can include an instruction that the driver and/or navigation system 40 should generate a new route.

At step 412, the controller 16 provides the instruction to cause the vehicle 12 to react, for example, by action of the driver. The instruction can be provided to the user interface 20 to cause the user interface 20 to provide a visual instruction to the driver via the display 22 and/or an audible instruction to the driver via the audible device 26. The visual and/or audible instruction can alert the driver of the presence of the at least one external object. The visual and/or audible instruction can instruct the driver, for example, to look in the direction of the detected external object. The visual and/or audible instruction can instruct the driver, for example, to stop the vehicle 12, proceed in the current lane, change to a different lane, or stop in view of an external object which is likely to obstruct the vehicle 12. The instruction can also be provided to the navigation system 40 to cause the navigation system to generate a new intended route.

In an embodiment, the controller 16 is further configured to generate the instruction based on the driver's attention level. The controller 16 can determine the driver's attention level by considering, for example, how often or quickly the driver is moving his or her head or eyes. The controller 16 can adjust a threshold for providing instructions based on the driver's attention level. For example, if the controller 16 determines that the driver's attention level is low, the controller 16 can provide more frequent instructions and/or increase a threshold for detecting and reporting an external object.

Figure 10:
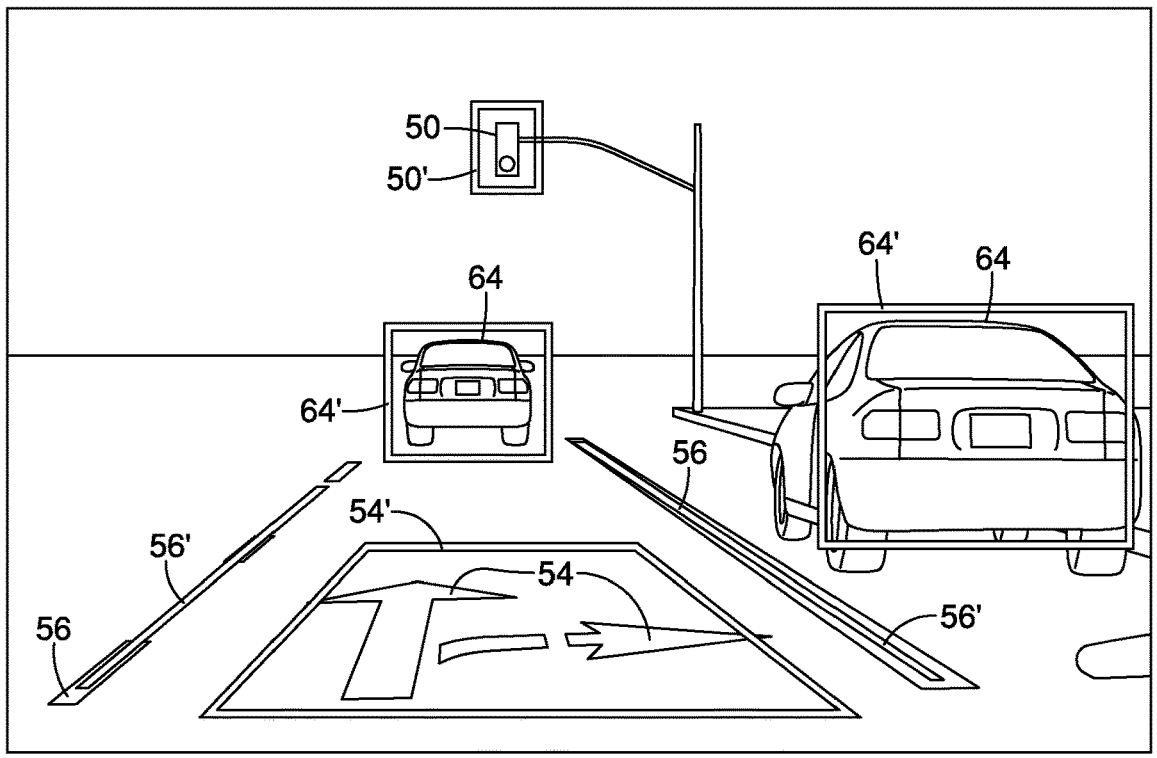
FIG. 10 illustrates an example embodiment of an image which can be provided to the driver of a vehicle in accordance with the systems and methods discussed herein to assist the driver with driving the vehicle.

In an embodiment which can be used with any of the methods discussed herein, the controller 16 provides instructions by altering the user interface 20 based on the detected external objects. FIG. 10 illustrates an example embodiment of a real-time image, based on the scene depicted in FIG. 4, which can be generated by the controller 16 to be displayed to the driver using the user interface 20. Here, the controller 16 provides the driver with a real time image as recorded by the first image sensor 30. The controller 16 adds icons into the real-time image to alert the driver to detected external objects. In the illustrated embodiment, the controller 16 has marked a detected traffic light with a traffic light boundary icon 50'. The controller 16 has marked a detected lane marking 54 with a lane marking icon 54'. The controller 16 has marked the detected lane boundaries 56 with lane boundary icons 56'. The controller 16 has marked the detected other vehicles 64 with vehicle icons 64'.

Figure 11:
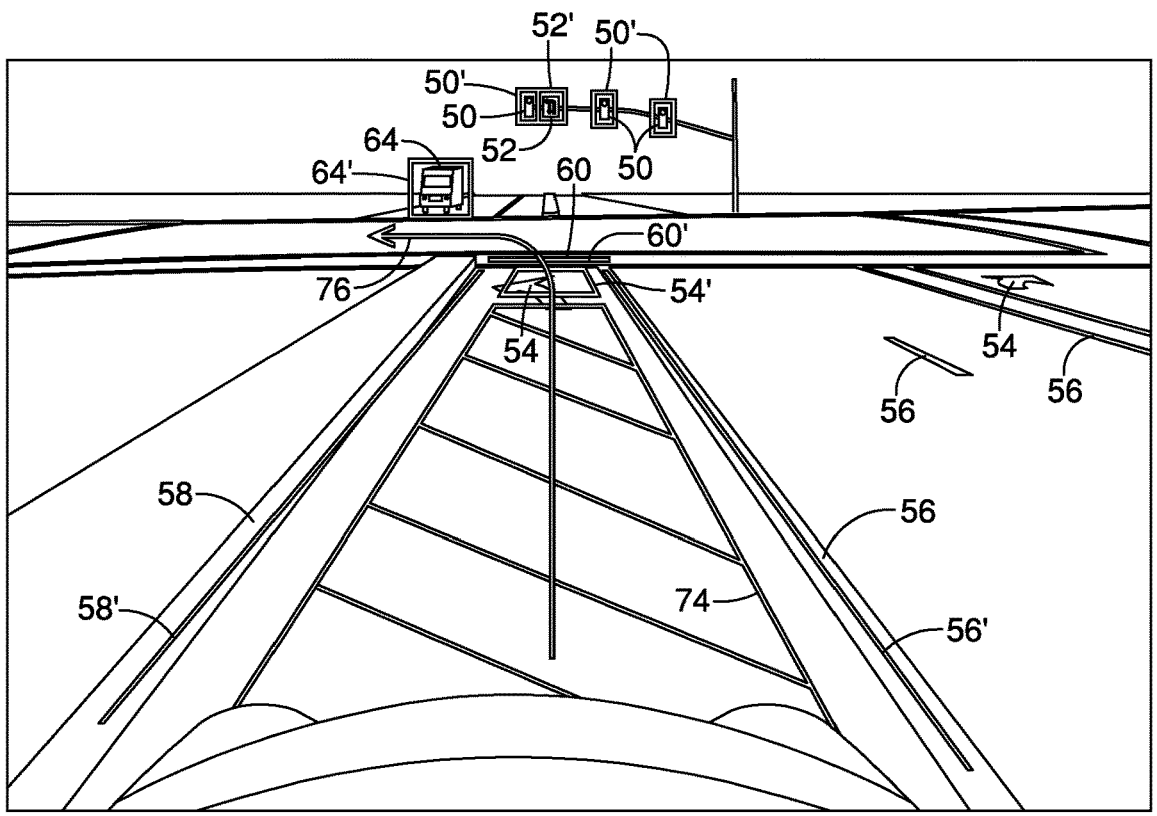
FIG. 11 illustrates another example embodiment of an image which can be provided to the driver of a vehicle in accordance with the systems and methods discussed herein to assist the driver with driving the vehicle.

FIG. 11 illustrates another example embodiment of a real-time image, based on the scene depicted in FIG. 5, which can be generated by the controller 16 to be displayed to the driver using the user interface 20. In the illustrated embodiment, the controller 16 has marked detected traffic lights with traffic light boundary icons 50'. The controller 16 has marked a detected traffic sign 54 with a traffic sign marking icon 54'. The controller 16 has marked a detected lane marking 54 for the current lane with a lane marking icon 54'. The controller 16 has marked a detected lane boundary 56 for the current lane with a lane boundary icon 56'. The controller 16 has marked a detected curb boundary 58 for the current lane with a curb boundary icon 58'. The controller 16 has marked a detected other vehicle 64 with a vehicle icon 64'. The controller 16 has also added a first drivable area path icon 74 showing the drivable area of the vehicle 12 within the current lane. The controller 16 has also added a second directional path icon 76 showing the intended turn through the intersection.

In an embodiment, the controller 16 can provide the icons shown in FIGS. 10 and 11 on the windshield of the vehicle 12 to provide the driver with an augmented reality view which highlights detected objects. This can be useful, for example, to focus the driver's attention on detected objects.

In an embodiment, the controller 16 is configured to place the lane boundary icon 56' based on the total size of the road instead of based on a detected lane boundary icon 56. The controller 16 can also be configured to add a stop line icon for the intersection.

In an embodiment, the system 10 can be configured to record data relating to the driver's reaction to detected external objects. This data can then be processed, for example using neural networks, to train autonomous vehicles to drive like human beings.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle 12 equipped as disclosed herein. Accordingly, these terms, as utilized to describe the present invention should be interpreted relative to a vehicle 12 equipped as shown herein.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of assisting a driver with navigation of a vehicle, the method comprising:
   receiving navigational data relating to an intended route of the vehicle;
   receiving object data relating to at least one external object detected within a vicinity of a current position of the vehicle;
   determining whether the at least one external object affects an ability of the vehicle to proceed along the intended route;
   generating at least one instruction for the driver of the vehicle relating to the ability of the vehicle to proceed along the intended route; and
   providing the at least one instruction to the driver of the vehicle to cause an action to be taken by the driver.

2. The method of claim 1, wherein
   the at least one external object includes at least one of (i) a traffic light, (ii) a traffic sign, (iii) a lane marking, (iv) a lane boundary, (v) a curb boundary, (vi) a crosswalk, (vii) a pedestrian, and (viii) another vehicle.

3. The method of claim 1, comprising
   determining a shape or location of the at least one external object based on the object data.

4. The method of claim 1, comprising
   determining that the at least one external object is a pedestrian with an intended path that interferes with the intended route of the vehicle.

5. The method of claim 1, comprising
   determining that the at least one external object is a traffic sign or lane marking which indicates that the vehicle is located within a wrong lane to proceed along the intended route.

6. The method of claim 5, comprising
   alerting the driver of the vehicle to change lanes based on the at least one instruction.

7. A system configured to perform the method of claim 1, the system comprising:
   a first image sensor configured to generate at least a portion of the object data; and
   a processor and a memory programmed to execute the method of claim 1 using the object data generated by the first image sensor.

8. A method of assisting a driver with navigation of a vehicle, the method comprising:
   receiving pedestrian data regarding a pedestrian detected within a vicinity of a current position of the vehicle;
   determining an intended path of the pedestrian;
   determining whether the intended path of the pedestrian interferes with an intended route of the vehicle;
   generating at least one instruction for the driver of the vehicle when the intended path of the pedestrian is determined to interfere with the intended route of the vehicle; and
   providing the at least one instruction to the driver of the vehicle to cause an action to be taken by the driver.

9. The method of claim 8, wherein
   determining the intended path of the pedestrian includes determining an intended walking direction of the pedestrian.

10. The method of claim 8, wherein
    determining the intended path of the pedestrian includes analyzing a detected pose of the pedestrian.

11. The method of claim 8, comprising
    receiving crosswalk data relating to a crosswalk detected within the vicinity of the current position of the vehicle, wherein determining the intended path of the pedestrian includes determining a proximity of the pedestrian to the crosswalk.

12. The method of claim 11, wherein determining the intended path of the pedestrian includes determining a direction that the pedestrian is facing at the crosswalk.

13. The method of claim 8, comprising alerting the driver of the vehicle of the intended path of the pedestrian based on the at least one instruction.

14. A system configured to perform the method of claim 8, the system comprising:
a first image sensor configured to generate at least a portion of the pedestrian data; and
a processor and a memory programmed to execute the method of claim 8 using the pedestrian data generated by the first image sensor.

15. A method of assisting navigation of a vehicle, the method comprising:
receiving driver data relating to a current line of sight detected for a driver of the vehicle, the driver data including head pose data regarding a direction that the driver's head is turned;
receiving object data relating to at least one external object detected within a vicinity of a current position of the vehicle;
determining that the at least one external object is outside of the current line of sight of the driver based at least in part on the direction that the driver's head is turned; and
generating at least one instruction relating to the at least one external object.

16. The method of claim 15, wherein the at least one external object includes at least one of (i) a traffic light, (ii) a traffic sign, (iii) a lane marking, (iv) a lane boundary, (v) a curb boundary, (vi) a crosswalk, (vii) a pedestrian, and (viii) another vehicle.

17. The method of claim 15, comprising alerting the driver of the presence of the at least one external object based on the at least one instruction.

18. The method of claim 15, comprising determining that the at least one external object is a pedestrian with an intended path that interferes with an intended route of the vehicle.

19. The method of claim 18, comprising determining the intended path of the pedestrian based on at least one of a pose of the pedestrian or a proximity of the pedestrian to a crosswalk.

20. A system configured to perform the method of claim 15, the system comprising:
a first image sensor configured to generate at least a portion of the object data;
a second image sensor configured to generate at least a portion of the driver data; and
a processor and a memory programmed to execute the method of claim 15 using the object data generated by the first image sensor and the driver data generated by the second image sensor.

* * * * *